United States Patent [19]

Primas et al.

[11] Patent Number: 4,863,666

[45] Date of Patent: Sep. 5, 1989

[54] PROCESS FOR PREPARING MOLDINGS OR COATINGS

[75] Inventors: Willi Primas, Simbach/Inn; Max Pröschkowitz, Altötting; Wilhelm Marsch, Haiming, all of Fed. Rep. of Germany

[73] Assignee: Wacker-Chemie GmbH, Munich, Fed. Rep. of Germany

[21] Appl. No.: 194,704

[22] Filed: May 17, 1988

[30] Foreign Application Priority Data

May 21, 1987 [DE] Fed. Rep. of Germany ....... 3717076

[51] Int. Cl.$^4$ ...................... B29C 43/02; B29C 45/00; B29C 45/02
[52] U.S. Cl. .................. 264/320; 264/328.2; 264/328.4; 264/328.6; 528/24; 528/31; 528/32
[58] Field of Search ...................... 264/240, 320, 328.2, 264/328.4, 328.6; 528/24, 31, 32

[56] References Cited

U.S. PATENT DOCUMENTS

| | | | |
|---|---|---|---|
| 3,107,234 | 10/1963 | Stewart | 264/328.4 X |
| 3,660,552 | 5/1972 | Hinz et al. | 264/328.6 X |
| 4,008,198 | 2/1977 | Krohberger et al. | 528/24 X |
| 4,098,861 | 7/1978 | Bassani | 264/240 X |
| 4,260,536 | 4/1981 | Yonezawa et al. | 528/24 X |
| 4,311,821 | 1/1982 | Weitemeyer et al. | 528/24 X |
| 4,382,057 | 5/1983 | Tolentino | 264/328.2 |
| 4,442,060 | 4/1984 | Bouverot et al. | 264/328.2 |
| 4,487,906 | 12/1984 | Kniege et al. | 528/24 X |
| 4,528,354 | 7/1985 | McDougal | 264/328.6 |
| 4,539,357 | 9/1985 | Bobear | 528/24 X |
| 4,758,647 | 1/1988 | Niwa et al. | 528/24 |

FOREIGN PATENT DOCUMENTS

| | | | |
|---|---|---|---|
| 149914 | 5/1950 | Australia | 528/24 |
| 663121 | 5/1963 | Canada | 528/24 |
| 726230 | 1/1966 | Canada | 528/24 |

*Primary Examiner*—Jeffery Thurlow
*Assistant Examiner*—Leo B. Tentoni

[57] ABSTRACT

A process for preparing moldings or coatings by compression molding, transfer molding or injection molding from materials which contain free-radical generators and an organopolysiloxane which can be crosslinked to form organopolysiloxane elastomers, in which the free-radical generators comprise at least one free-radical generator having a half-life in benzene of 1 minute at 60° C. to 149° C. and at least one free-radical generator having a half-life in benzene of 1 minute at 150° C. to 200° C. Other materials which may be molded are those which can be crosslinked by the addition reaction of Si-bonded hydrogen with SiC-bonded vinyl groups and also contain at least one free-radical generator.

8 Claims, No Drawings

PROCESS FOR PREPARING MOLDINGS OR COATINGS

The present invention relates to a process for preparing moldings or coatings and more particularly to a process for preparing moldings or coatings from materials which are shaped by compression molding, transfer molding or injection molding.

BACKGROUND OF THE INVENTION

Moldings have been prepared heretofore by compression molding, transfer molding or injection molding of organopolysiloxane materials containing free-radical generators which can be crosslinked to form organopolysiloxane elastomers. See, for example, W. Lynch, "Handbook of Silicone Fabrication", Van Nostrand Reinhold Company, New York, 1978.

It is an object of the present invention to provide a process for preparing moldings or coatings from materials which contain free-radical generators and can be crosslinked to form organopolysiloxane elastomers. Another object of the present invention is to provide a process for preparing moldings or coatings from materials which can be crosslinked to form organopolysiloxane elastomers and contain free-radical generators, in which the materials are shaped by compression molding, transfer molding and injection molding. Another object of the present invention is to provide a process for preparing moldings or coatings from materials which are rapidly crosslinked. Still another object of the present invention is to provide a process for preparing moldings or coatings from materials which are rapidly crosslinked, even when the moldings have complicated shapes. A further object of the present invention is to provide a process for preparing moldings or coatings which can be easily and rapidly removed from the molds in the absence of release agents. A still further object of the present invention is to provide a process for preparing moldings or coatings from materials which are readily available by shaping the materials in an apparatus used for compression molding, transfer molding or injection molding. Still a further object of the present invention is to provide a process for preparing moldings or coatings having low shrinkage when the materials are crosslinked.

SUMMARY OF THE INVENTION

The foregoing objects and others which will become apparent from the following description are accomplished in accordance with this invention, generally speaking, by providing a process for preparing moldings or coatings from materials containing organopolysiloxanes and free-radical generators which comprises shaping by compression molding, transfer molding or injection molding materials containing organopolysiloxanes which can be crosslinked to form organopolysiloxane elastomers and at least one free-radical generator having a half-life in benzene of 1 minute at 60° C. to 149° C., and at least one free-radical generator having a half-life in benzene of 1 minute at 150° C. to 200° C. The organopolysiloxane materials can also be crosslinked by the addition reaction of Si-bonded hydrogen with SiC-bonded vinyl groups which also contain at least one free-radical generator.

DESCRIPTION OF THE INVENTION

In preparing the moldings and coatings of this invention, the materials containing an organopolysiloxane capable of being crosslinked to form elastomers and containing free-radical generators are shaped by compression molding, transfer molding and injection molding.

The preparation of coatings by the process of this invention can be, for example, the encapsulation of electrical or electronic components.

Examples of free-radical generators having a half-life in benzene of 1 minute at 60° C. to 149° C., in which the half-life is generally determined at a concentration of 0.1 mole of free-radical generator per liter, are dibenzoyl peroxide bis-(4-chlorobenzoyl) peroxide, bis-(2,4-dichlorobenzoyl) peroxide, peroxycarbonates, such as diacetyl peroxydicarbonate, dimyristyl peroxydicarbonate, dicyclohexyl peroxydicarbonate, bis-(4-tert-butylcyclohexyl) peroxydicarbonate, di-n-butylperoxydicarbonate, di-2-ethylhexyl peroxydicarbonate and diisotridecyl peroxydicarbonate, azobis-(2,4-dimethylvaleronitrile) and azo-bis-(isobutyronitrile).

Examples of free-radical generators having a half-life in benzene of 1 minute at 150° C. to 200° C., in which the half-life is also determined at a concentration of 0.1 mole of free-radical generator per liter of benzene, are di-tert-butyl peroxide, dicumyl peroxide, 2,5-bis-(tert-butylperoxy)-2,5-dimethylhexane, tert-butyl perbenzoate, tert-butyl perisononanoate and tert-butyl peroxyisopropyl carbonate.

The temperature at which one of the free-radical generators has a half-life of 1 minute in benzene is preferably at least 15° C. different from the temperature at which each of the other free-radical generators in the same crosslinkable material has a half-life of 1 minute in benzene.

The free-radical generators may be present in the same general amounts in the materials used in the process of this invention which contain free-radical generators and can be crosslinked to form organopolysiloxane elastomers as have been or could have been used heretofore in materials which contain free-radical generators and can be crosslinked to form organopolysiloxane elastomers and can be shaped by compression molding, transfer molding or injection molding. These amounts are preferably from about 0.1 to 3 percent by weight, and more preferably from about 0.1 to 1 percent by weight, based on the total weight of the particular material which can only be crosslinked by free-radical crosslinking, and from 0.1 to 3 percent by weight, based on the weight of the diorganopolysiloxanes present in the materials which can be crosslinked by the addition reaction of Si-bonded hydrogen with SiC-bonded vinyl groups and which also contain at least one free-radical generator. This free-radical generator may have a half-life in benzene of 1 minute at any temperature in the range of from 60° to 200° C.

The amount of free-radical generator(s) having a half-life in benzene of 1 minute at 60° to 149° C. is preferably from about 1 to 70 percent by weight, and more preferably from 3 to 60 percent by weight, based on the total amount of free-radical generators.

The preferred combination of free-radical generators used in the process of this invention are combinations of peroxidic free-radical generators.

When the materials are shaped by compression molding or transfer molding, it is preferred that the combinations of peroxidic free-radical generators contain from 0.1 to 1 percent by weight, based on the total weight of the particular material, of dicumyl peroxide and from 0.05 to 1 percent by weight, based on the total weight of the particular material, of dibenzoyl peroxide. More preferably, when the materials are shaped by compression molding or transfer molding, then it is preferred that about 0.35 percent by weight of dicumyl peroxide, based on the total weight of the particular material, and about 0.15 percent by weight of dibenzoyl peroxide, based on the total weight of the particular material, be employed.

When materials are employed in injection molding, preferred combinations of peroxidic free-radical generators are those containing from 0.1 to 1 percent by weight, based on the total weight of the particular material, of dicumyl peroxide and from 0.05 to 1 percent by weight, based on the total weight of the particular material, of dibenzoyl peroxide and from 0.01 to 0.5 percent by weight, based on the total weight of the particular material, of bis-(2,4-dichlorobenzoyl) peroxide.

More preferably, the combinations of peroxidic free-radical generators, which are employed in materials that are shaped by injection molding contain about 0.35 percent by weight, based on the total weight of the particular material, of dicumyl peroxide and about 0.12 percent by weight, based on the total weight of the particular material, of dibenzoyl peroxide and 0.04 percent by weight, based on the total weight of the particular material, of bis-(2,4-dichlorobenzoyl) peroxide.

Other than the free-radical generator combinations used in this invention, the materials are the same materials as those which have been or could have been crosslinked to form organopolysiloxane elastomers in the presence of only one free-radical generator, which can be shaped by compression molding, transfer molding or injection molding.

Likewise, the materials which are used in the process of this invention and can be crosslinked to form organopolysiloxane elastomers by the addition reaction of Si-bonded hydrogen with SiC-bonded vinyl groups are the same compositions as those that have been employed heretofore in compression molding, transfer molding or injection molding, except for the presence of at least one free-radical generator.

It is preferred that the organopolysiloxanes present in the materials which are employed in the process of this invention and contain free-radical generators have a maximum of 5, and more preferably a maximum of 1.5, SiC-bonded organic radicals having an aliphatic carbon-carbon multiple bond per 100 silicon atoms.

The process of this invention can be carried out in the same equipment and at the same temperatures and pressures as the processes known heretofore for the production of moldings or coatings from materials which contain free-radical generators and can be crosslinked to form organopolysiloxane elastomers, in which the shaping takes place by compression molding, transfer molding or injection molding. Likewise, the same equipment and same temperatures and pressures may be used in the process of this invention as were used in the production of moldings or coatings from materials which can be crosslinked to form organopolysiloxane elastomers by the addition reaction of Si-bonded hydrogen with SiC-bonded vinyl groups in which the shaping can take place by compression molding, transfer molding or injection molding.

When the materials are those which are to be crosslinked exclusively by free-radical formation, then temperatures of from 170° to 190° C. are preferred when the preferred peroxide combinations employed consist of 2 or 3 peroxides.

In the following examples, all parts and percentages are by weight, unless otherwise specified.

EXAMPLE 1

(a) About 100 parts of a trimethylsiloxy-terminated organopolysiloxane comprising 99.93 mole percent of dimethylsiloxane units and 0.07 mole percent of vinylmethylsiloxane units having a viscosity of $8 \times 10^6$ mPa.s at 25° C. are mixed in a compounder operated at 150° C., first with 42 parts of silicon dioxide in the gas phase and having a BET surface area of 200 m$^2$/g, then with 7 parts of a dimethylpolysiloxane which has an Si-bonded hydroxyl group in each of the terminal units and a viscosity of 40 mPa.s at 25° C., and after the compounder has cooled, with 0.35 part of dicumyl peroxide and 0.3 part of a paste containing equal parts of dibenzoyl peroxide and a trimethylsiloxy-terminated dimethylpolysiloxane having a viscosity of 250 mPa.s at 25° C.

(b) The material, prepared in accordance with the procedure described in (a) above which contains free-radical generators and can be crosslinked to form an organopolysiloxane elastomer is processed in a commercially available injection-molding machine ("Allrounder" 270-90-350, "Allrounder" is a registered trademark, Arburg Maschinenfabrik Hehl & Söhne, D-7298 Lossburg), whose injection cylinder is warmed to 40° C. while the part of the machine effecting final shaping of the material is warmed to 185° C., to form square tiles as test specimens having an edge length of about 180 mm per side, of which about 20 mm has a thickness of 6 mm, about 130 mm has a thickness of 2 mm, and about 30 mm has a thickness of 1 mm.

(c) The completely non-adherent tiles can be easily demolded after only 35 seconds. After 35 seconds, the tiles have a Shore A hardness of from 29 to 30 at the 6 mm cross-section and a Shore A hardness of 45 at the 2 mm cross-section. At the 6 mm cross-section, the tiles which have been removed from the mold and then warmed ("annealed") at 200° C. for 4 hours have a Shore A hardness of 46.

EXAMPLE 2

The procedures described in Example 1 (a) and (b) above are repeated, except that 0.35 part of dicumyl peroxide, 0.25 part of a paste comprising equal parts of dibenzoyl peroxide and the trimethylsiloxy-terminated dimethylpolysiloxane having a viscosity of 250 mPa.s at 25° C., and 0.08 part of a paste comprising equal parts of bis-(2,4-dichlorobenzoyl) peroxide and the dimethylpolysiloxane mentioned above are substituted for the 0.35 part of dicumyl peroxide and the peroxide containing paste.

The non-adherent tiles can be demolded very easily after only 35 seconds. After 35 seconds, they have a Shore A hardness of 31 to 32 at the 6 mm cross-section and a Shore A hardness of 45 at the 2 mm cross-section. At the 6 mm cross-section, the tiles which have been removed from the mold and then warmed at 200° C. for 4 hours have a Shore A hardness of 46.

EXAMPLE 3

The procedure described in Example 2 is repeated, except that the injection pressure is $111 \times 10^5$ Pa (abs.), instead of 116×10⁵ Pa (abs.), and 0.4 pat of the paste containing equal parts of dibenzoyl peroxide and the trimethylsiloxy-terminated dimethylpolysiloxane having a viscosity of 250 mPa.s at 25° C. is substituted for the 0.25 part of this paste, and 0.1 part of the paste containing equal parts of bis-(2,4-dichlorobenzoyl) peroxide and the trimethylsiloxy-terminated dimethylpolysiloxane of the abovementioned type is substituted for the 0.08 part of the paste.

The non-adherent tiles can be demolded very easily after only 35 seconds. After 35 seconds, they have a Shore A hardness of 41 at the 6 mm cross-section and a Shore A hardness of 53 at the 2 mm cross-section. At the 6 mm cross-section, the tiles which have been removed from the mold and then warmed at 200° C. for 4 hours have a Shore A hardness of 56.

COMPARISON EXAMPLE V$_1$

The procedure described in Example 3 is repeated, except that 0.7 part of dicumyl peroxide is substituted for the dicumyl peroxide used therein and the two peroxide-containing pastes.

After 80 seconds it is possible to demold the tiles, which still adhered to the mold surface. After the 80 seconds, they have a Shore A hardness of from 31 to 32 at the 6 mm cross-section and a Shore A hardness of 49 at the 2 mm cross-section.

EXAMPLE 4 AND COMPARISON EXAMPLE V$_2$

The procedure described in Example 2 is repeated, except that the injection-molding machine part effecting final shaping is warmed to 180° C., instead of 185° C.

TABLE

|  | Linear Shrinkage (1) (Percent) |
|---|---|
| Example 4 (2) | 3.5 |
| (3) | 4.5 |
| Comparison (2) | 4.8 |
| Example V$_2$ (3) | 5.5 |

(1) = Difference between the sides of the injection-molding machine part effecting final shaping which are 180 mm from two internal sides and an edge length of the molding produced in this machine.
(2) = Before annealing.
(3) = After annealing.

What is claimed is:

1. A process for preparing moldings or coatings by compression molding, transfer molding or injection molding which comprises shaping a material containing free-radical generators and an organopolysiloxane which is free of Si-bonded hydrogen and is capable of being crosslinked to form an organopolysiloxane elastomer, in which the free-radical generators consist of at least one free-radical generator having a half-life of 1 minute at 60° C. to 149° C. and at least one free-radical generator having a half-life in benzene of 1 minute at 150° to 200° C.

2. A process for preparing moldings or coatings by compression molding, transfer molding or injection molding which comprises shaping a material containing an organopolysiloxane which is capable of being crosslinked to form an organopolysiloxane elastomer by the addition reaction of Si-bonded hydrogen to SiC-bonded vinyl groups and at least one free-radical generator in an amount of from 0.1 to 3 weight percent based on the weight of the crosslinkable organopolysiloxane.

3. The process of claim 1, wherein the temperature at which the one free-radical generator has a half-life in benzene of 1 minute is at least 15° C. different from the temperature at which each of the other free-radical generators in the same crosslinkable material has a half-life in benzene of 1 minute.

4. The process of claim 2, wherein the organopolysiloxane material contains two free-radical generators, in which the temperature of one free-radical generator having a half-life in benzene of 1 minute is at least 15° C. different from the temperature at which the other free-radical generator in the same crosslinkable material has a half-life in benzene of 1 minute.

5. The process of claim 1, wherein the shaping takes place by compression molding or transfer molding and the free-radical generators are dicumyl peroxide and dibenzoyl peroxide.

6. The process of claim 4, wherein the shaping takes place by compression molding or transfer molding and the free-radical generators are dicumyl peroxide and dibenzoyl peroxide.

7. The process of claims 1, 3 or 5, wherein the shaping takes place by injection molding and the free-radical generators are dicumyl peroxide, dibenzoyl peroxide and bis-(2,4-dichlorobenzoyl) peroxide.

8. The process of claim 2, wherein the shaping takes place by injection molding and the free-radical generators are dicumyl peroxide, dibenzoyl peroxide and bis-(2,4-dichlorobenzoyl) peroxide.

* * * * *